United States Patent [19]

Lin

[11] Patent Number: 5,867,506
[45] Date of Patent: Feb. 2, 1999

[54] CD-ROM TESTING SYSTEM

[75] Inventor: Don Lin, Chung Li, Taiwan

[73] Assignee: Behavior Tech Computer Corporation, Taipei, Taiwan

[21] Appl. No.: 917,126

[22] Filed: Aug. 25, 1997

[51] Int. Cl.$^6$ .................................................. G11C 29/00
[52] U.S. Cl. .................... 371/21.1; 395/185.01; 371/48
[58] Field of Search ............... 371/21.1, 48; 395/185.01; 365/200, 201

[56] References Cited

U.S. PATENT DOCUMENTS 5,761,168  6/1998  Kwon ......................................... 369/58
5,768,286  6/1998  Hsu et al. ............................... 371/21.2

Primary Examiner—Phung M. Chung
Attorney, Agent, or Firm—Rosenberg, Klein & Bilker

[57] ABSTRACT

A CD-ROM testing system includes a personal computer, a programmable logic control (PLC), a testing apparatus with sensors and an industrial man-machine interface. The personal computer is in communication with the PLC for performing tests on the CD-ROM. The PLC is connected to both the personal computer and the man-machine interface to control the operation of the testing apparatus. The testing apparatus is to carry out tests on the CD-ROM and collects the test results. The man-machine interface is to indirectly control the testing apparatus and display test signal. The CD-ROM testing system is capable to replace human labor in continuously testing a plurality of CD-ROMs to provide an efficient and precise test results of the functions of the CD-ROMs and the test results are stored in the personal computer for further use and analysis.

2 Claims, 4 Drawing Sheets

CD-ROM TESTING SYSTEM

FIELD OF THE INVENTION

The present invention relates to a CD-ROM testing system and in particular to a system which incorporates a programmable logic control (PLC) to control the operation of an automatic CD-ROM testing apparatus in order to perform testson all functions of a plurality of CD-ROMs in an automatic and sequential manner and thus facilitate the quality control of the CD-ROM products and increase the manufacturing efficiency.

BACKGROUND OF THE INVENTION

CD-ROMs that have been completed in a manufacturing line are subject to tests on all functions thereof, such as disk carrier tray opening/closing, disk driving, data reading and the lighting of all the LED (light emitting diode) indicators, in order to ensure the quality of the CD-ROMs before they are packed and shipped. Conventionally, the CD-ROMs are tested manually, and in order to avoid the reduction of the quality caused by errors and mistakes, the CD-ROMs are only tested by trained and experienced operators. However, the testing operation which includes opening/closing the tray, loading/unloading test disk, repeatedly checking the indicators is a very boring and monotonous job so that even the most experienced operators may accidentally make mistake in the test of the CD-ROMs. This causes serious problem in the quality control.

Another disadvantage associated with manual test operation of the CD-ROM products is that it requires a lot of labor. This increases the overall cost of the CD-ROMs. Training operators is also a significant cost. This all makes the manual test operation very inefficient and costly.

Thus, in order to improve the conventional manual test operation of CD-ROM products, it is desired to have a CD-ROM test system which allows a plurality of CD-ROM products to be tested automatically and sequentially so as to overcome the drawbacks in the prior art.

SUMMARY AND OBJECTS OF THE INVENTION

Therefore, the primary object of the present invention is to provide a CD-ROM testing system which comprises a personal computer, a programmable logic control (PLC), a testing apparatus with sensors and an industrial man-machine interface, wherein the personal computer is in communication with the PLC, serving as a control center of the CD-ROM testing operation, the testing apparatus performs test on the CD-ROMs and collects the test result under the control of the PLC and the man-machine interface indirectly controls the testing apparatus to display test signals so that the conventional human labor based CD-ROM test operation may be replaced by the more efficient and more precise automatic testing system of the present invention.

Another object of the present invention is to provide a CD-ROM testing system in which the PLC is operated by software installed therein in advance to control the operation of the testing apparatus, and the test result is stored and analyzed in the testing operation procedure to provide an evaluation report of the CD-ROMs tested so as to standardize and unifies the CD-ROM test procedure and enhance the quality control thereof.

In accordance with the present invention, a work station that incorporates the CD-ROM testing system of the present is capable to operate 24 hours a day in testing CD-ROM products and a single operator is capable to monitor a number of work stations of this kind in the operation of testing the CD-ROM products so that labor and thus cost and time needed in testing the CD-ROM products are cut down and manufacturing efficiency of the CD-ROMs increased.

BRIEF DESCRIPTION OF THE DRAWINGS

The above and other objects, advantages and features of the present invention will be readily apparent from the following detailed description of a preferred embodiment thereof, with reference to the accompanying drawings, wherein.

DETAILED DESCRIPTION OF THE PREFERRED EMBODIEMNT

Figure 1:
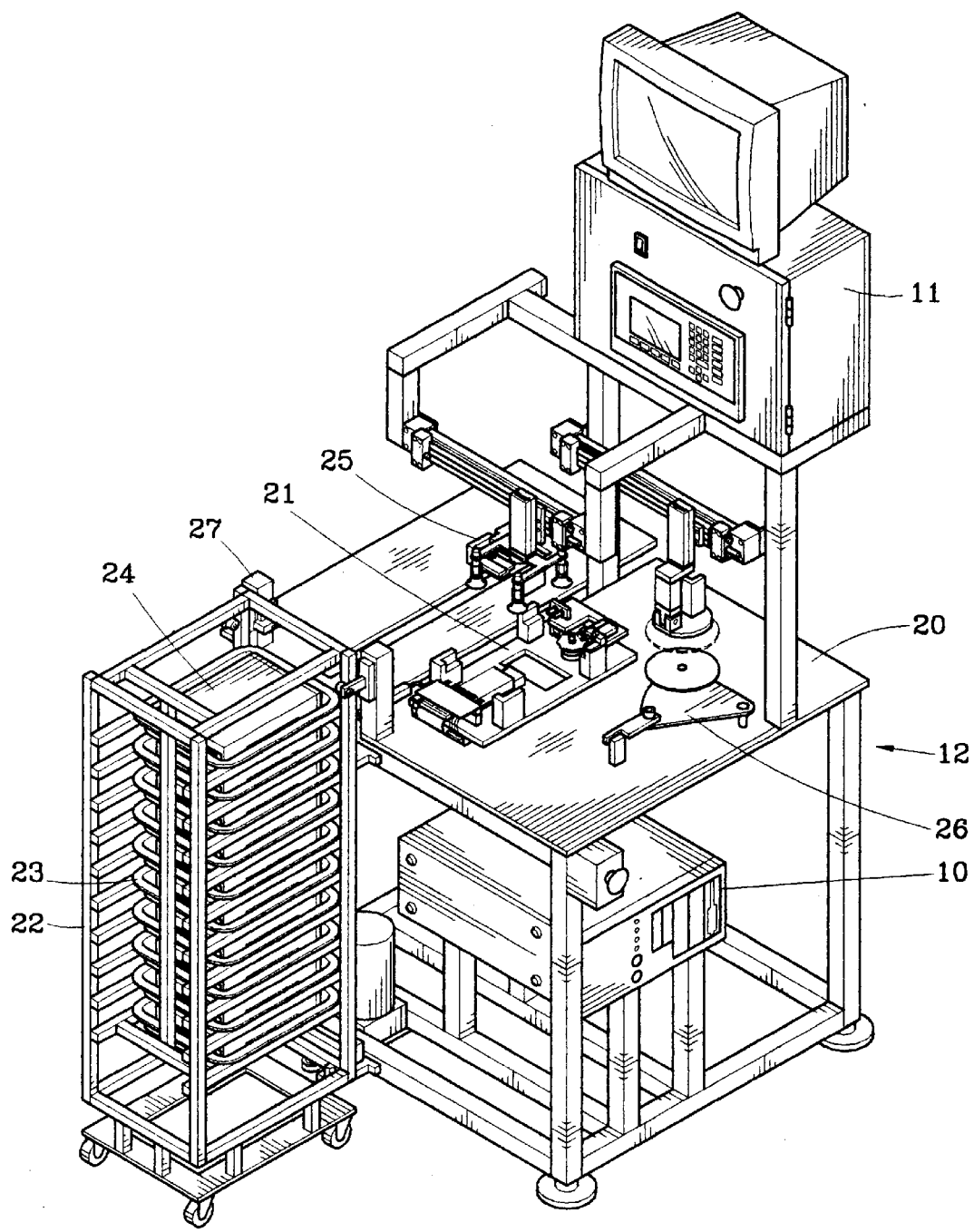
FIG. 1 is a perspective view showing a work station incorporating a CD-ROM testing system in accordance with the present invention.
Figure 2:
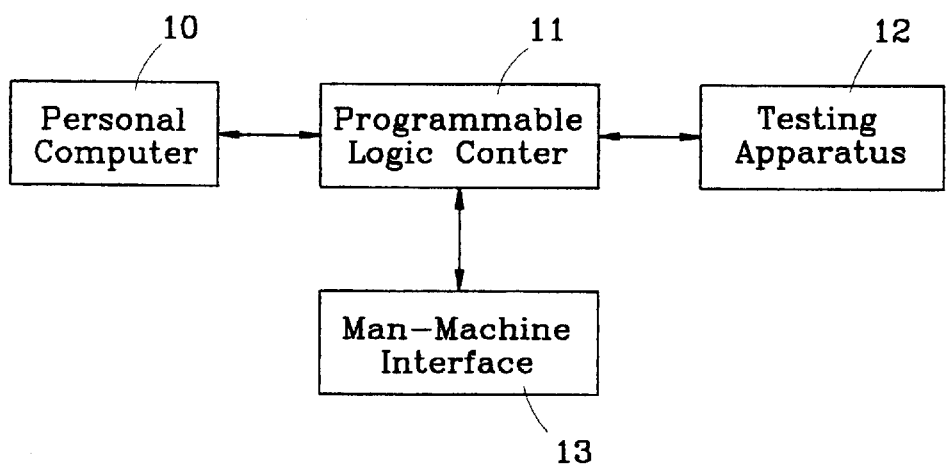
FIG. 2 is a block diagram of the CD-ROM testing system in accordance with the present invention.

With reference to the drawings and in particular to FIG. 2, wherein a block diagram of a CD-ROM testing system in accordance with the present invention is shown, the CD-ROM testing system of the present invention comprises a personal computer 10, a programmable logic controller (PLC) 11, a testing apparatus 12 that comprises a power supply terminal for supplying power to the CD-ROM to bet tested and sensors for detecting the functioning of the CD-ROM and an industrial man-machine interface 13 which all together constitute a test station as shown in FIG. 1.

The personal computer 10 is in communication with the PLC 11 and serves as a control center of test operation performed on CD-ROM products to be tested in accordance with the present invention. The PLC 11 is also connected to both the personal computer 10 and the man-machine interface 13 and is to control the operation of the testing apparatus 12. The testing apparatus 12 is to perform testing operation on CD-ROM products and to collect the test results therefrom. The man-machine interface 13 is to indirectly control the testing apparatus 12 and to display test signals.

As shown in FIG. 1, in a preferred embodiment of the present invention, the testing apparatus 12 comprises a work table 20 on which a test site 21 is provided. The personal computer 20 is arranged on the underside of the work table 20. The PLC 11 is positioned above the work table 20. A CD-ROM supply cart 22 is arranged to be movable relative to the work table 20 to approach and engage a lifting mechanism 27 provided on a front side of the work table 20 or disengage from and move away from the lifting mechanism 27. The CD-ROM supply cart 22 comprises a plurality of CD-ROM support trays 23 stacked over each other and defining a number of different levels, each of the CD-ROM support trays 23 receiving therein a CD-ROM 24 to be tested. With the provision of the CD-ROM supply cart 22, a plurality of CD-ROM support trays 23, together with the CD-ROM 24 to be tested, may be conveyed toward the apparatus 12 and the plurality of CD-ROMs 24 are sequentially and automatically fed into to the testing system to be tested thereby. The testing apparatus 20 further comprises a CD-ROM gripping mechanism 25 which is arranged above the test site 21 for moving the CD-ROM 24 from the respective CD-ROM support tray 23 to the test site 21 and to return the tested CD-ROM to the CD-ROM support tray 23. Disk supply means 26 is also included in the testing apparatus 12 to convey a test disk (not shown) to the CD-ROM 24 located in the test site 21 to allow the CD-ROM to drive and access data on the test disk and to retrieve the disk from the CD-ROM once the testing operation of the specific CD-ROM is completed.

The testing apparatus 12 also comprises controllable power device to drive the power supply terminal and the sensors (both not shown in the drawings) thereof to engage the CD-ROM 24 so as to supply power to the CD-ROM 24 for driving it and to sense the functioning of the CD-ROM 24.

In starting the testing operation, with the CD-ROM supply cart 22 engaging the lifting mechanism 27 of the testing apparatus 12 to have the CD-ROM support tray 23 positioned in a specific level corresponding to and ready to be picked up by the lifting mechanism 27, the CD-ROM testing system controls the testing apparatus 12 to pick up one of the CD-ROM support trays 23, together with the CD-ROM 24 supported therein, from the CD-ROM supply cart 22 by means of the CD-ROM gripping mechanism 25 and moves and positions the CD-ROM 24 to the test site 21. The test disk is then positioned into the CD-ROM 24 with the disk supply means 26 and the test starts under the control of the PLC 11 that executes program installed therein beforehand. Once the test operation is completed, the disk and the CD-ROM are respectively returned by the disk supply means 26 and the CD-ROM gripping mechanism 25. The CD-ROM support tray 23 and the tested CD-ROM 24 are then positioned back to the CD-ROM supply cart 22. The PLC 11 now controls the lifting mechanism 27 to move the CD-ROM supply cart 22 relative to the work table 20 to the next level and to allow the CD-ROM gripping mechanism 25 to pick up the CD-ROM support tray 23 and the CD-ROM 24 therein of the next level. The test operation is repeated until all the CD-ROMs 24 that are carried by the C-ROM supply cart 22 are tested or the operation is terminated manually.

In the following, an example of the operation procedure of the CD-ROM testing system in accordance with the present invention by using the testing apparatus described above will be given. The CD-ROM testing system performs the testing operation by means of the testing apparatus 12 discussed above under the control of the PLC 11 which is in turn operated by means of software or programs installed therein in advance. The man-machine interface 13 cooperates with the testing apparatus 12 to perform the operation and to display the test signals. A flow chart of the operation procedure of the system is given in FIG. 3 of the attached drawings, wherein the left hand side illustrates a standard operation flow of the testing system and the right hand side is an error warning procedure which is initiated when an error is in encountered in the operation.

Figure 3:
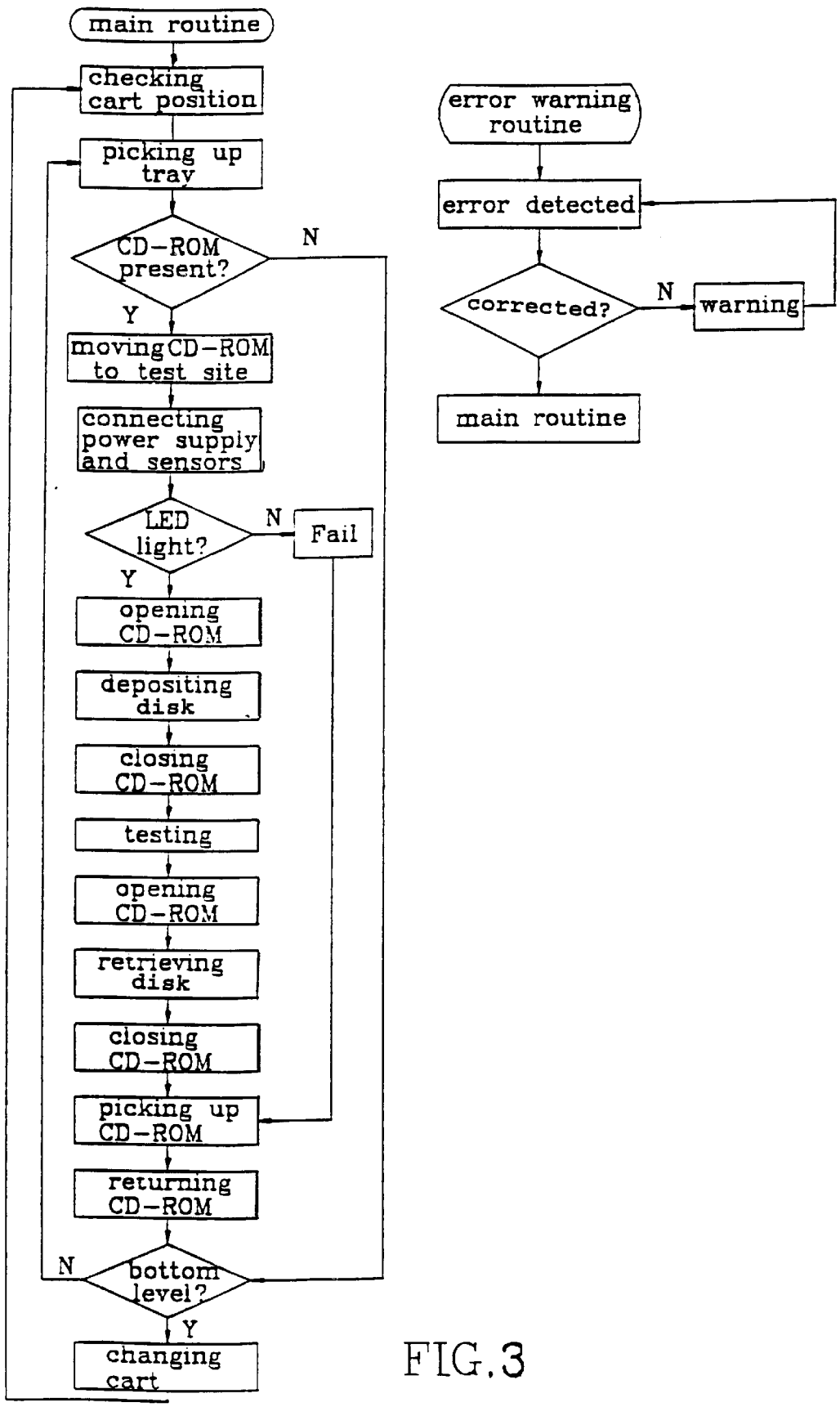
FIG. 3 is an example flow chart illustrating the operation procedure performed by the CD-ROM testing system in accordance with the present invention.

As shown in FIG. 3, the flow of the operation procedure of the CD-ROM testing system of the present invention is as follows:

1. initiating the system;
2. checking the position of the CD-ROM supply cart: when the system is initiated, the CD-ROM supply cart is first checked if it is properly positioned and engaged by the lifting mechanism so as to determine a current level of the CD-ROM support trays and if it is, the procedure goes to the next step, otherwise the error warning procedure is initiated (see right hand side of FIG. 3) to provide a warning the system operator to indicate the error;
3. picking up the CD-ROM support tray: the CD-ROM gripping mechanism picks up the CD-ROM support tray of the current level from the CD-ROM supply cart;
4. checking the CD-ROM support tray: the system checks if a CD-ROM is present in the CD-ROM support tray that is picked up by the CD-ROM gripping mechanism and if it is, the procedure goes to the next step, otherwise the procedure goes to step 16 to have the empty CD-ROM support tray moved back to the CD-ROM supply cart;
5. conveying the CD-ROM to the test site: the CD-ROM gripping mechanism moves the CD-ROM to the test site;
6. connecting the power supply and sensors to the CD-ROM: the system connects the power supply terminal and the sensors to the CD-ROM by means of suitable driving devices to power and monitor the CD-ROM in the test site;
7. checking power LED indicator of the CD-ROM: if the LED indicator of the CD-ROM to be tested lights when the power supply is connected to the CD-ROM which indicates the CD-ROM is correctly powered on and the LED indicator is properly functioning, then the procedure goes to the next step to continue the operation, otherwise the LED indicator fails to light and the CD-ROM malfunctions and then the procedure goes to step 15 to have the CD-ROM picked up and returned to the CD-ROM supply cart by the CD-ROM gripping mechanism and in accordance with the present invention, preferably, the returned the CD-ROM is positioned on the bottom level of the CD-ROM supply cart;
8. opening the CD-ROM: when the LED indicator is normal and lights, the system opens the CD-ROM to have the disk carrier tray exposed;
9. depositing the test disk in the CD-ROM: the disk supply means positions the test disk into the disk carrier tray of the CD-ROM;
10. closing the CD-ROM: the system closes the CD-ROM to have the disk carrier tray retrieved back into the CD-ROM;
11. performing test procedure: the system performs tests on all the functions of the CD-ROM, including power supply, LED indicator, opening/closing disk carrier tray and running the disk (see FIG. 4);
12. opening the CD-ROM to withdraw the disk carrier tray;
13. retrieving the disk: the disk supply means picks up and retrieves the disk from the CD-ROM disk carrier tray;
14. closing the CD-ROM;
15. picking up the CD-ROM: the CD-ROM gripping mechanism picks up the CD-ROM from the test site;
16. returning the CD-ROM: the CD-ROM gripping mechanism returns the CD-ROM together with the CD-ROM support tray back into the CD-ROM supply cart;
17. checking the bottom level of the CD-ROM supply cart: the system checks if there is a support tray in the next level of the CD-ROM supply cart and if not, it reaches the lowermost (bottom) level which indicates that the CD-ROM supply cart should be replaced by a new one, otherwise the system picks up the next support tray (together with the CD-ROM supported therein) and the procedure goes back to step 3 to test the next CD-ROM; and 18. changing the CD-ROM supply cart: when the CD-ROM suply cart reaches the bottom level, the system generates a warning signal to inform the operator to change the current CD-ROM supply cart with a new one that carrier further CD-ROMs to be tested and the procedure goes back to step 2.

Figure 4:
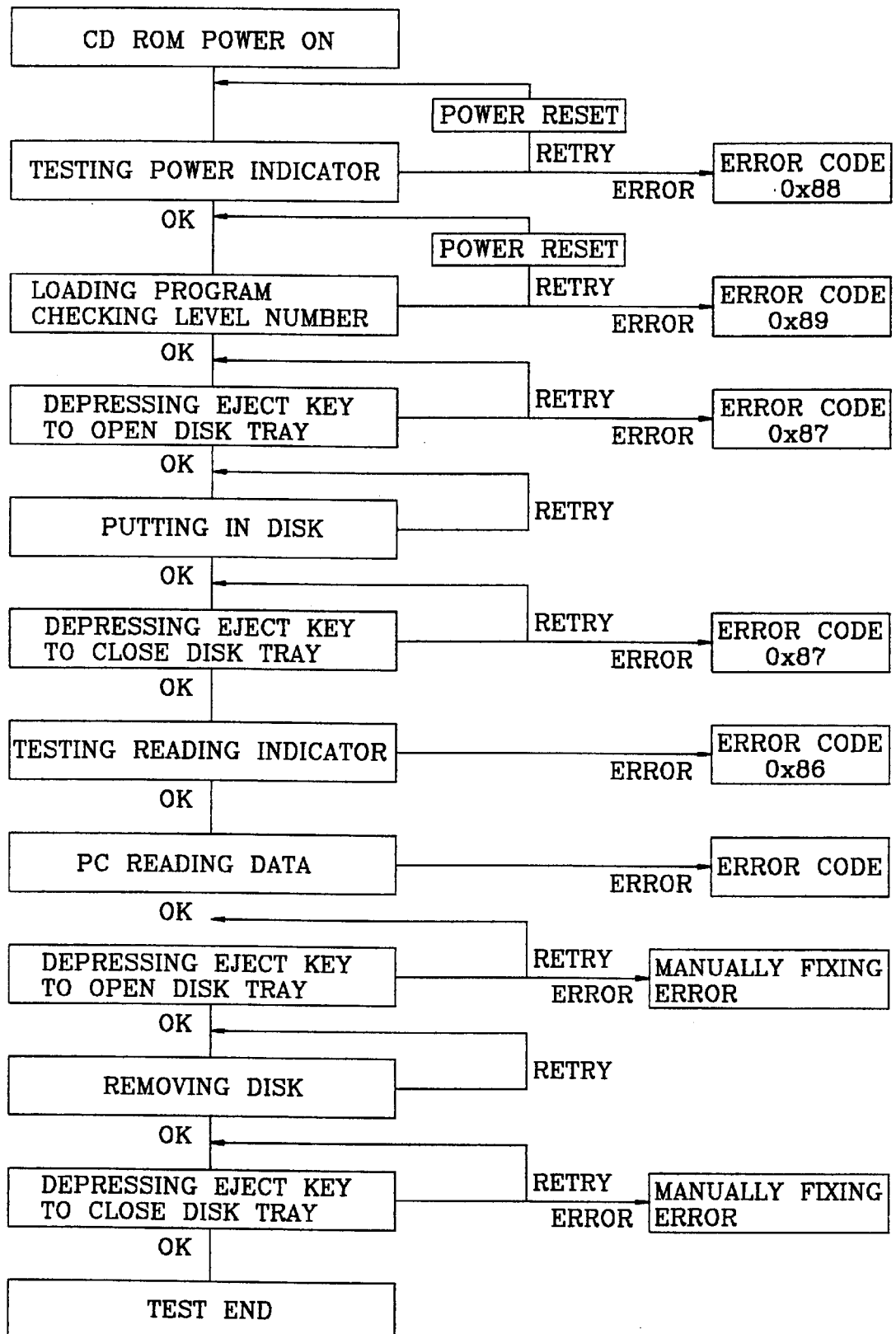
FIG. 4 is a flow chart of the CD-ROM testing procedure carried out by the testing apparatus incorporated in the CD-ROM testing system of the present invention.

In the above procedure, the CD-ROM that is positioned into the test site is subject to the tests of all the functions thereof, as shown in FIG. 4, under the control of the testing system, wherein the test items and procedure in accordance with the preferred embodiment are as follows:

1. powering on the CD-ROM to be tested with the CD-ROM engaged by the power supply terminal of the testing apparatus;
2. testing the power indicator LED and resetting the power supply and repeating the step and recording error, if any, and generating an error code 0x88;
3. loading program, checking the level number of the CD-ROM supply cart, resetting the power supply and repeating the step and recording error, if any, and generating an error code 0x89;
4. opening the disk tray by depressing an eject key of the CD-ROM and repeating the step and recording error, if any, and generating an error code 0x87;
5. depositing in the test disk and repeating the step;
6. closing the disk tray by depressing the eject key again and repeating the step and recording error, if any, and generating an error code 0x87;
7. testing reading indicator LED, waiting for CD-ROM ready by delaying 3 seconds and recording error, if any, and generating an error code 0x86;
8. using the personal computer to read data from the test disk and recording error, if any;
9. opening the disk tray by depressing the eject key and repeating the step and fixing error manually, if any;
10. picking up the disk and repeating the step;
11. closing the disk tray by depressing the eject key again and repeating the step and fixing error manually, if any; and
12. ending the procedure.

As shown in FIG. 2, each time when the system controls the testing apparatus 12 to complete the test of one CD-ROM 24, the CD-ROM gripping mechanism 25 of the testing apparatus 12 is actuated to pick up the CD-ROM 24 from the test site 21 and position the CD-ROM 24 back into the associated CD-ROM support tray 23 and the CD-ROM 24, together with the CD-ROM support tray 23, is returned to the CD-ROM supply cart 22. The lifting mechanism 27 is actuated to move the CD-ROM supply cart 22 to the next level. Thus the CD-ROMs 24 carried in the CD-ROM supply cart 22 are sequentially conveyed to the test site and then back to the CD-ROM supply cart 22 and the system repeats the test operation on each of the CD-ROMs 24 until all the CD-ROMs 24 carried in the CD-ROM supply cart 22 are tested and then a signal is sent to the operator who is monitoring the test operation to replace the CD-ROM supply cart with a new one that carries further CD-ROMs to be tested.

In the operation of the testing system, if any error is detected by the system, an error warning procedure (right hand side of FIG. 3) is initiated to inform the operator for correcting the error (such as checking or replacing the CD-ROM supply cart). As shown in the right hand side of FIG. 3, once an error is detected, the procedure jumps to a error correcting routine and an error warning signal is generated to call the operator to fix the error. If the error is corrected, the procedure goes back to the main routine, otherwise the warning maintains.

All the test results collected during test procedure are supplied to the personal computer 10 by the PLC 11 and stored therein for further processing and analysis which in turn provides an evaluation report of the CD-ROMs. Thus a standardized and unified test operation on all the CD-ROMs may be obtained and the quality of the CD-ROMs may be ensured.

A work station that incorporates the testing system in accordance with the present invention may be operated under the control of any desired software to perform tests on CD-ROMs in a substantially non-stop manner, 24 hours a day and seven days a week, and an operator is capable to simultaneously monitor several work stations of this kind. Thus, the labor and thus the cost and time needed in testing the CD-ROMs may be greatly cut down and the manufacturing efficiency increased.

The above description is made with respect to the preferred embodiment of the present invention and for those skilled in the art, it is possible to made a variety of modifications and changes to the above-described embodiment without departing from the scope and spirit of the present invention. All these modifications and changes should be considered within the scope of the present invention as defined in the appended claims.

What is claimed is:

1. A CD-ROM testing system comprising a personal computer serving as a control center of CD-ROM testing operation, a programmable logic control which is in communication with the personal computer to execute software, a testing apparatus which is in communication with the programmable logic control to be controlled thereby by means of the execution of the software to perform testing operation on CD-ROMs and collect test results of the CD-ROMs, the testing apparatus comprising a CD-ROM supply cart in which a plurality of CD-ROM support trays each carrying a CD-ROM to be tested are stacked over each other to define a number of different levels, the CD-ROM supply cart being engaged by a lifting mechanism for moving the CD-ROM supply cart to reach different level under the control of the programmable logic control and a man-machine interface for indirectly controlling the testing apparatus and displaying test signals, wherein the programmable logic control is operated by the software that is installed therein in advance to control the testing apparatus to perform a test procedure on the CD-ROMs to test functions of the CD-ROMs and to store the test results in the personal computer, wherein the CD-ROM testing system is operated in accordance with the following steps:

(1) initiating the system;
(2) checking position of the CD-ROM supply cart: when the system is initiated, the CD-ROM supply cart is first checked if it is properly positioned and engaged by the lifting mechanism so as to determine a current level of the CD-ROM support trays and if it is, the procedure goes to the next step, otherwise an error warning procedure is initiated to provide a warning the system operator to indicate the error;

(3) picking up the CD-ROM support tray: a CD-ROM gripping mechanism that is incorporated in the testing apparatus and controlled by the programmable logic control picks up the CD-ROM support tray of the current level from the CD-ROM supply cart;

(4) checking the CD-ROM support tray: the system checks if a CD-ROM is present in the CD-ROM support tray that is picked up by the CD-ROM gripping mechanism and if it is, the procedure goes to the next step, otherwise the procedure goes to step 16 to have the empty CD-ROM support tray moved back to the CD-ROM supply cart;

(5) conveying the CD-ROM to the test site: the CD-ROM gripping mechanism moves the CD-ROM to a test site provided on the testing apparatus for carrying out the test procedure;

(6) connecting power supply and sensors to the CD-ROM: the system connects a power supply terminal and the sensors which are provided on the testing apparatus and movable relative to the test site by being controlled by the programmable logic control to the CD-ROM to power and monitor the CD-ROM in the test site;

(7) checking power LED indicator of the CD-ROM: if the power LED indicator of the CD-ROM to be tested lights when the power supply is connected to the CD-ROM which indicates the CD-ROM is correctly powered on and the LED indicator is properly functioning, then the procedure goes to the next step to continue the operation, otherwise the power LED indicator fails to light and the CD-ROM malfunctions and then the procedure goes to step 15 to have the CD-ROM picked up and returned to the CD-ROM supply cart by the CD-ROM gripping mechanism;

(8) opening the CD-ROM: when the power LED indicator is normal and lights, the system opens the CD-ROM to have a disk carrier tray of the CD-ROM exposed;

(9) depositing test disk in the CD-ROM: disk supply means incorporated in the testing apparatus positions the test disk into the disk carrier tray of the CD-ROM;

(10) closing the CD-ROM: the system closes the CD-ROM to have the disk carrier tray retrieved back into the CD-ROM;

(11) performing the test procedure: the system performs tests on the CD-ROM;

(12) opening the CD-ROM to withdraw the disk carrier tray;

(13) retrieving the test disk: the disk supply means picks up and retrieves the test disk from the CD-ROM disk carrier tray;

(14) closing the CD-ROM;

(15) picking up the CD-ROM: the CD-ROM gripping mechanism picks up the CD-ROM from the test site;

(16) returning the CD-ROM: the CD-ROM gripping mechanism returns the CD-ROM together with the CD-ROM support tray back into the CD-ROM supply cart;

(17) checking bottom level of the CD-ROM supply cart: the system checks if there is a support tray in the next level of the CD-ROM supply cart and if not, it reaches the bottom level which indicates that the CD-ROM supply cart should be replaced by a new one, otherwise the system picks up the next support tray together with the CD-ROM supported therein and the procedure goes back to step 3 to test the next CD-ROM; and

(18) changing the CD-ROM supply cart: when the CD-ROM supply cart reaches the bottom level, the system generates a warning signal to inform the operator to change the current CD-ROM supply cart with a new one that carrier further CD-ROMs to be tested and the procedure goes back to step 2.

2. The CD-ROM testing system as claimed in claim 1, wherein the test procedure comprises the following steps:

(a) powering on the CD-ROM to be tested with the CD-ROM engaged by the power supply terminal of the testing apparatus;

(b) testing the power indicator LED and resetting the power supply and repeating the step and recording error, if any;

(c) loading program, checking the level number of the CD-ROM supply cart, resetting the power supply and repeating the step and recording error, if any;

(d) opening the disk tray by depressing an eject key of the CD-ROM and repeating the step and recording error, if any;

(e) depositing the test disk into the disk tray of the CD-ROM and repeating the step;

(f) closing the disk tray by depressing the eject key again and repeating the step and recording error, if any;

(g) testing reading indicator LED, waiting for CD-ROM ready by delaying a period of time and recording error, if any;

(h) using the personal computer to read data from the test disk and recording error, if any;

(i) opening the disk tray by depressing the eject key and repeating the step and fixing error manually, if any;

(j) picking up the disk and repeating the step;

(k) closing the disk tray by depressing the eject key again and repeating the step and fixing error manually, if any; and (l) ending the procedure.

\* \* \* \* \*